Oct. 5, 1954 P. E. FISCHER ET AL 2,690,865
ADJUSTABLE FILLING HEAD
Filed July 11, 1949 3 Sheets-Sheet 1
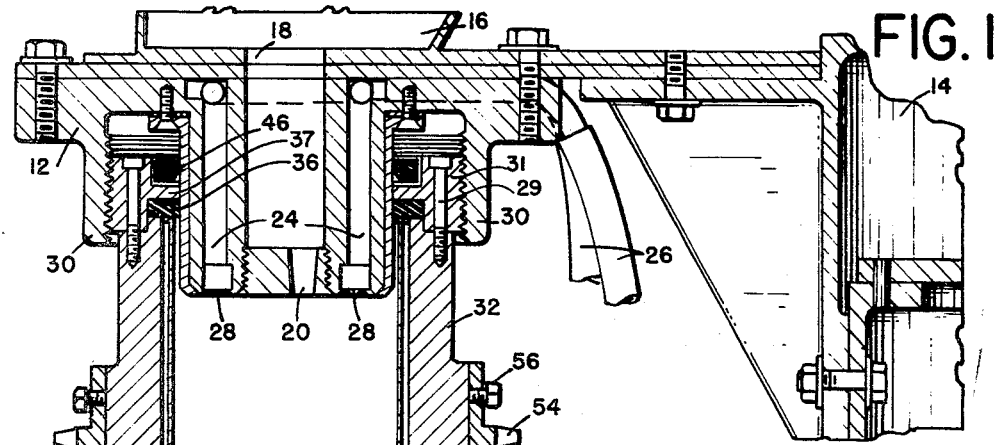
FIG. 1
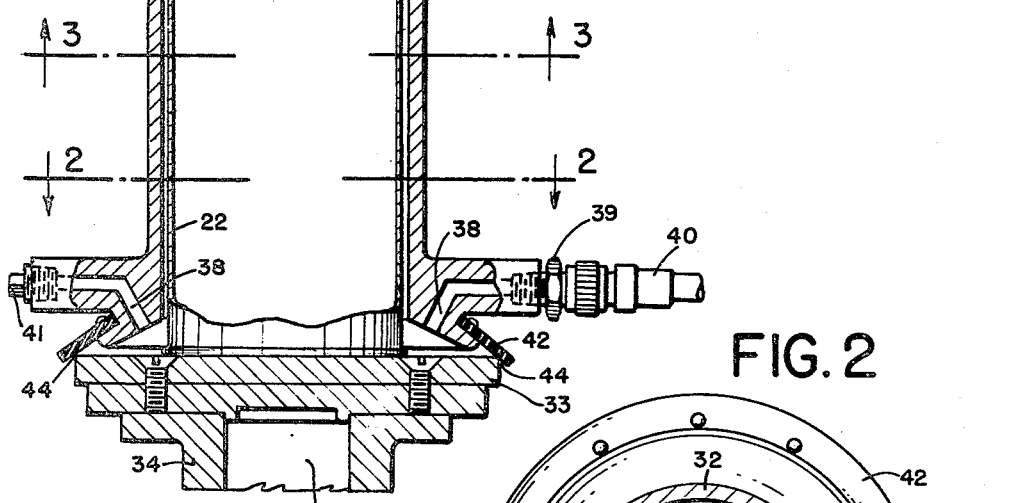
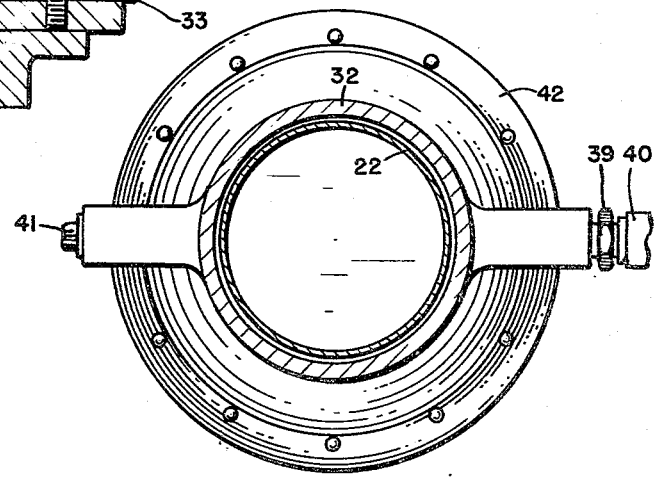
FIG. 2
INVENTORS:-
PAUL E. FISCHER
MORTIMER B. STURDEVANT
BY William C. Strueber ATTORNEY

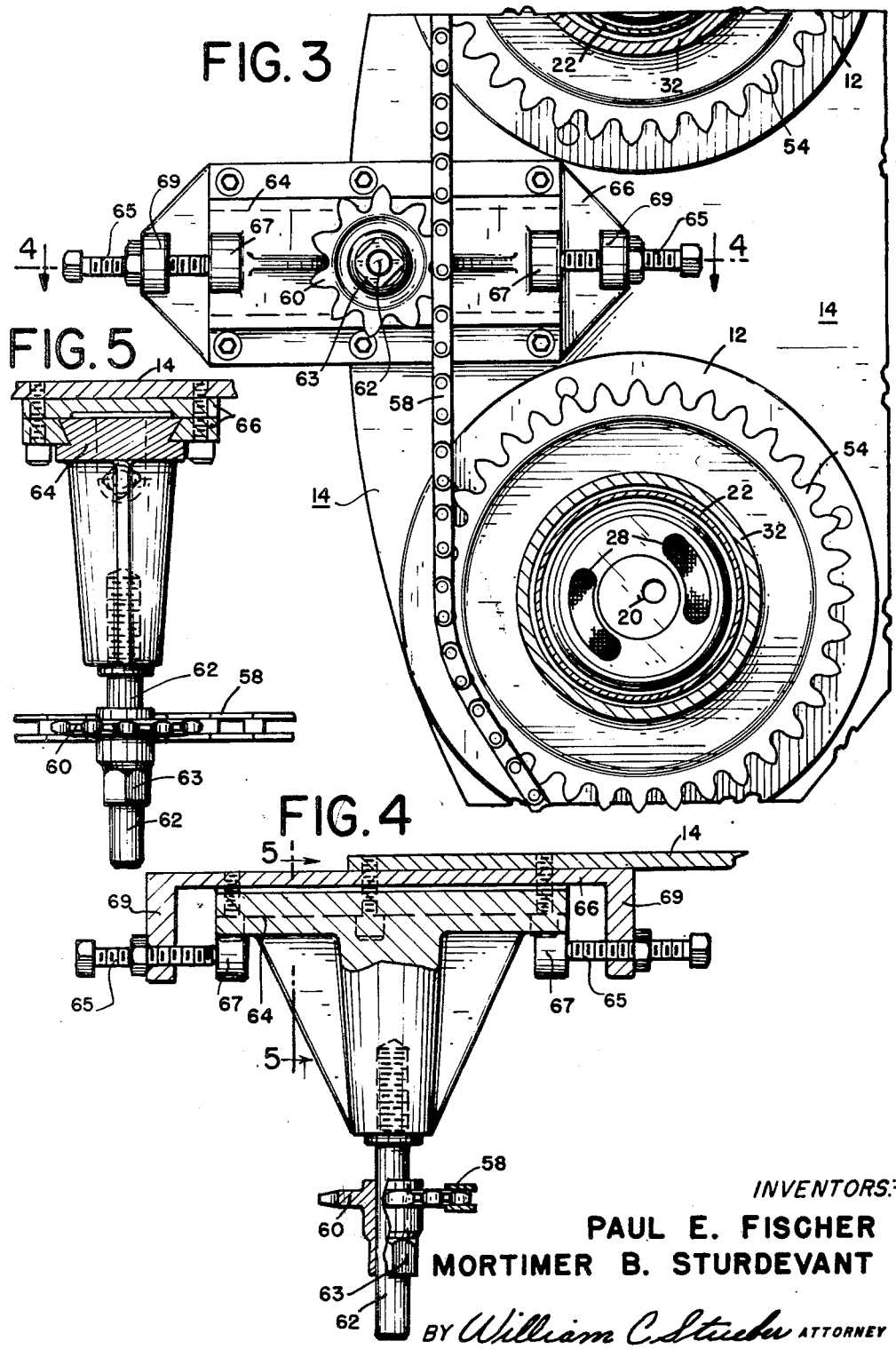

Oct. 5, 1954  P. E. FISCHER ET AL  2,690,865
ADJUSTABLE FILLING HEAD
Filed July 11, 1949  3 Sheets-Sheet 3

INVENTORS:-
PAUL E. FISCHER
MORTIMER B. STURDEVANT
BY William C. Strueber ATTORNEY Patented Oct. 5, 1954

2,690,865

UNITED STATES PATENT OFFICE 2,690,865

ADJUSTABLE FILLING HEAD

Paul E. Fischer and Mortimer B. Sturdevant, Minneapolis, Minn., assignors to General Mills, Inc., a corporation of Delaware Application July 11, 1949, Serial No. 104,134

18 Claims. (Cl. 226—116)

This invention relates to improvements in apparatus for filling containers with powdered or comminuted materials.

An object of the invention is to provide a filling machine whereby the filling head may be positively and accurately adjusted to vary the amount of powdered material filled into the container and whereby the filling adjustment of a series of filling heads can be uniformly varied with one adjustment.

Another object of the invention is to provide an adjustable vacuum filling head with a sealed vacuum chamber surrounding the container preventing the collapse of the container and whereby the filling chamber is isolated from the vacuum chamber outside the container, and the filling chamber is sealed from the adjustment and other working parts to prevent powdered filling material from contacting or fouling said parts and whereby adjustment of the head will not affect the seals.

Another object is to provide a vacuum sealed enclosure for a container allowing insertion of the container at the open bottom and having a positive seal at said opening not affected by powdered filling material or by small variances in length of containers.

Another object is to provide a vacuum type filling head with a vacuum-tight enclosure for the container having an opening to attach to a vacuum connection to evacuate the air and whereby when filling adjustment is made by rotating the enclosure an opening will always be convenient to the vacuum connection.

A further object is to provide a filling head for filling cartons non-circular in cross section and which is adjustable to vary the amount of material filled into the container.

Other objects and advantages will become apparent in the following description and accompanying drawings, in which:

Figure 1 is a vertical sectional view of an adjustable filling head mechanism;

Fig. 2 is a horizontal section taken on line 2—2 of Fig. 1;

Fig. 3 is a bottom plan view illustrating a filling machine employing a plurality of adjustable filling heads;

Fig. 4 is a vertical section taken on line 4—4 of Fig. 3 of the mechanism for adjusting the heads;

Fig. 5 is a vertical section taken on line 5—5 of Fig. 4;

Figure 6:
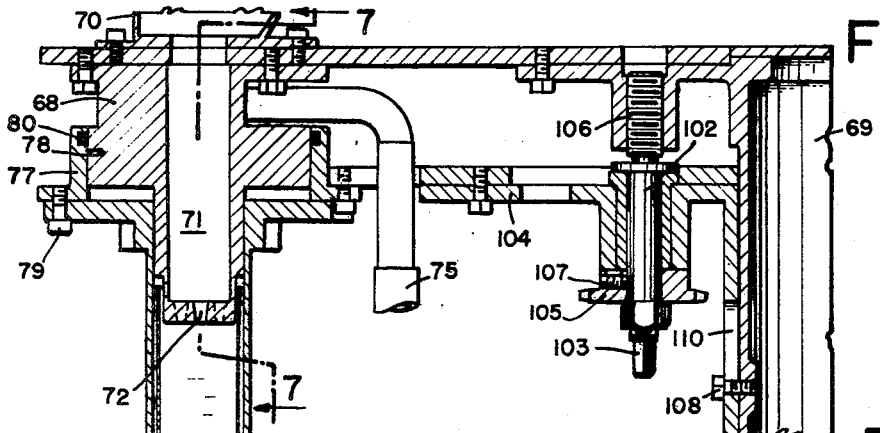
Fig. 6 is a vertical section of an alternate mechanism embodying the invention.

The mechanism embodying the invention illustrates a vacuum type filling apparatus wherein a powdered or comminuted material is to be filled into a container such as a box, carton, can, etc. The filling head is inserted down into the open container and the top of the container sealed against the atmosphere. Air is evacuated from the container and the powdered material in the filling head, being subjected to atmospheric pressure, is forced down into the evacuated container.

The material will continue to flow into the container until it piles up against the holes of the filling head, blocking the incoming material and the vacuum source. The powdered material piling up against either the filling holes or the vacuum intake will stop the further filling of the container. Thus it is apparent that the depth to which the filling head and the vacuum source are inserted into the container will control the point at which the filling stops and hence the amount of material filled in each container. The present invention provides a means of accurately controlling the amount of powdered material filled by adjusting the depth to which the filling head is inserted into the container opening.

The preferred embodiment of the invention illustrated in the drawings shows a vacuum type filling head 12 suitably mounted on a support post or framework 14. A reservoir 16 containing filling material and open to atmospheric pressure is positioned above the filling head and leads through the filling passage 18 and through a filling hole or mouth 20 to the container 22. During operation the lower projecting portion of the filling head which carries the filling passage is inserted into the container opening. One or more vacuum passages 24 also lead through the lower filling head into the container and connect at their upper ends through tubes 26 to a controlled vacuum source, not shown. When vacuum is applied through the passageways to withdraw the air from the container the atmospheric pressure draws down the powdered material from the reservoir through the filling passageway and holes and into the container. Screens 28 are placed over the vacuum passageways preventing the powdered material from being sucked up by the air withdrawal.

An internally threaded annular flange 30 depends from the head concentric with the filling head projection. For purposes of providing a vacuum chamber to surround and prevent col-

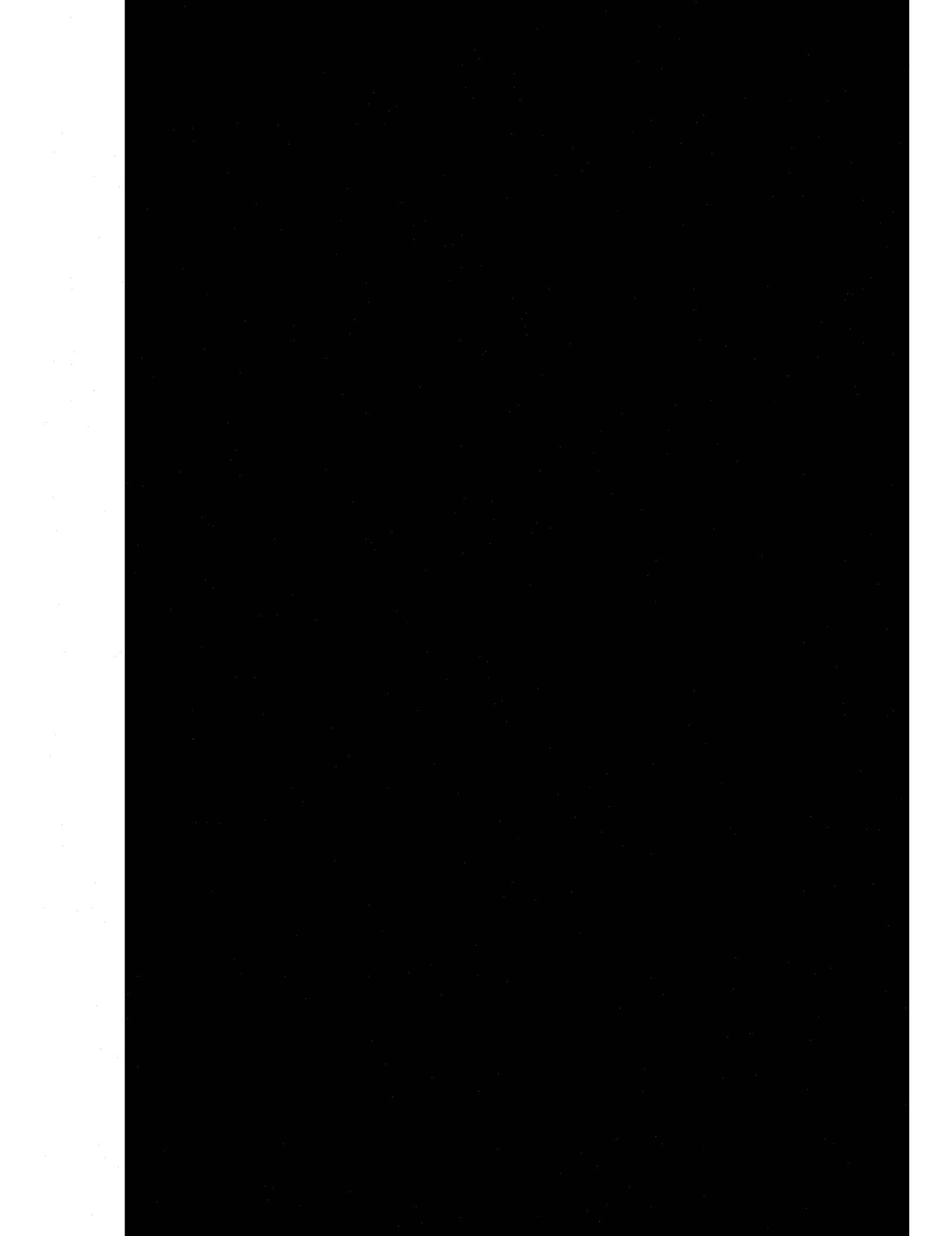

shrouds contacting the outward facing gear teeth of each shroud. A pinion gear 60 is rotatably mounted on a vertical shaft to operably contact the connecting chain. Turning the pinion will move the chain linearly, rotating each shroud an equal amount, thus changing the vertical position of the openings of the lower filling head with respect to the container tops an equal distance. The pinion is loosely mounted on its shaft 62 to move axially along the shaft to maintain the level of the chain as it moves down or up with the rotated shrouds. The pinion is provided with a square end 63 to facilitate turning with a wrench or crank.

The vertical shaft carrying the pinion is fixed to a sliding plate 64 which is laterally adjustable with respect to the chain. A pair of supporting channel plates 66 bolted to the frame and extending radially of the center support framework 14 are provided to adjustably carry the sliding plate on the filling head assembly. Lugs 67 depending from the sliding plate 64 are encountered by setscrews 65 threaded into projecting lugs 69 on one of the plates 66. The setscrews may be adjusted to slide the pinion assembly radially inward or outward to tighten or loosen the connecting chain. To individually adjust each shroud the setscrews 56 on the gear rings may be loosened and the individual shroud freely rotated.

An alternate embodiment of the invention is shown in Figs. 6, 7, 8 and 9. This structure is particularly adaptable to use with a container of rectangular cross section and where a shroud having other than a circular cross section must be provided.

Referring to Fig. 6, the head 68 is supported by a framework 69. A reservoir 70 containing filling material and open to atmospheric pressure is positioned above the filling head and feeds into the container through the filling passage 71 and through a preferred number of filling holes 72. Vacuum passages 73 (Fig. 7) lead through the filling head to be covered by screens 74 at their lower end and connect to tubes 75 at their upper end leading to a controlled vacuum source, not shown.

The shroud 76 extends upwardly and an annular flange 77 substantially concentric with the lower filling head is secured by bolts 79 to the upper end of the shroud to telescope over a cylindrical vertical face 78 of the filling head. A circular packing or gasket 80 carried by the annular flange is positioned between the telescoping sliding surfaces to isolate the filling chamber from the atmosphere, preventing powdered filling material from escaping to foul or corrode the surrounding working parts.

Figure 9:
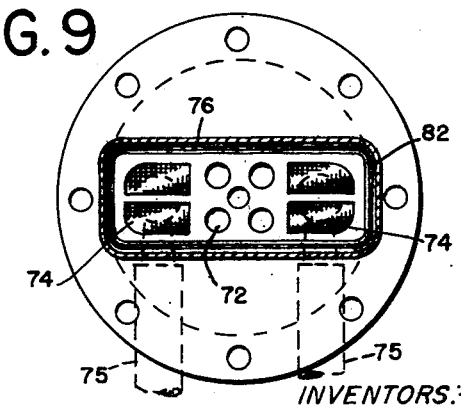
Fig. 9 is a horizontal section taken on line 9—9 of Fig. 7.

The shroud 76 is rectangular in cross section and encloses a rectangular container 82, as is shown in Fig. 9. A circular container supporting platform 84 mounted on the elevator 86 pushes the containers up into the shroud as air pressure is admitted into the elevator cylinder 88 by mechanism, not shown. Where a flexible container such as a bag is used, means other than the container must be provided to stop the upward movement of the elevator and platform. For this purpose, a lug 90 on the elevator strikes an adjustable setscrew 92 threaded into a fixed portion of the framework 69.

When the filling device is adjusted by moving the shroud up or down, the setscrew must be adjusted so the stopping point of the elevator is just at the lower end of the shroud and the upper end of the bag projects between the filling head and shroud.

The shroud is provided with an opening 94 having a fitting 96 to be connected to a vacuum line 98. The bottom of the shroud is circular and has a flap 100 extending outwardly and down to cooperatively form a seal with the edge of the platform.

A shaft 102 is rotatably journaled in a radial extension arm 104 on the shroud and is adjustably screwed in a threaded hole 106 in the filling head framework 69. The radial extension arm of the shroud is slidably attached to the framework by a stud 108 extending through a vertical slot 110 in the extension arm and threaded into the framework. Rotation of the shaft 102 will move the shroud up and down away from and toward the head, to adjust the relative location of the container and the filler head, i. e. the extent to which the filler head can move into and out of the container opening, thus controlling the level to which the powdered material is to be filled. The shaft 102 is squared at the end 103 for accommodation of a wrench or crank for turning.

This alternate structure for filling rectangular cartons may be used on a machine having a series of filling heads mounted around a center mounting. By arranging a series of filling heads, as shown in Fig. 6, in a circular pattern and providing a series of vertical adjusting shafts with pinions, a chain drive similar to that of Fig. 3 may be used. Such a pinion is shown in Fig. 6 at 105 and is locked on shaft 102 by a setscrew 107.

Figure 7:
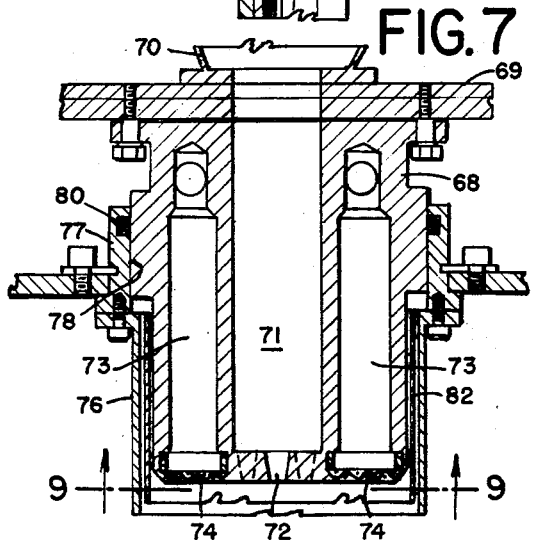
Fig. 7 is an enlarged vertical section taken on line 7—7 of Fig. 6.
Figure 8:
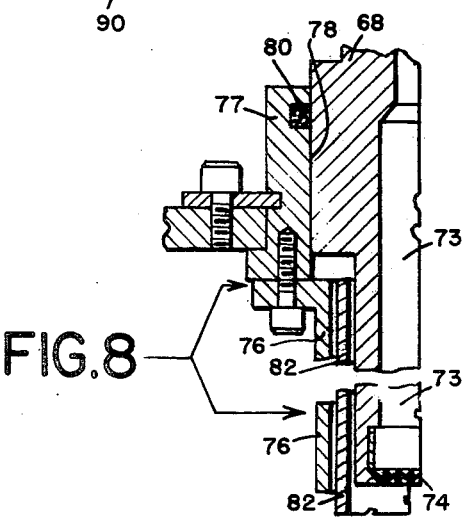
Fig. 8 is an enlarged view of a portion of Fig. 7.

It will be noticed that Fig. 6, showing the alternate adaptation of the invention for filling rectangular containers, has no seal provided at the top edge of the container. The container shown is of the soft paper bag type as contrasted with the semi-rigid container illustrated in Fig. 1. The vertical space between the side of the lower filler head and shroud is very small by design, allowing space only to insert the container top as illustrated in Figs. 6, 7 and 8. This small space prevents the turbulent filled powdered material from being swept over the container edge to fall between the outside of the container and shroud wall. As the vacuum in the filling chamber of the container is kept the same as that between the container wall and shroud, there is substantially no passage of air over the container top to carry filling materials. This flexible paper bag type container often has a greater distance from the surface of the filled material to the top of the container to provide bag material for a folding closure which means the filling material has farther to go to pass over the top of the container.

It is to be understood that either of the embodiments of the invention, as shown in Figs. 1 and 6, could be designed for filling the semi-rigid or for filling the paper bag type soft container.

Thus it will be seen we have provided an adjustable filling head which is uncomplicated in design and structure and which is easily adjustable to positively control the amount of powdered material filled into a container. The invention may be adapted to use for filling rigid, semi-rigid or soft containers of round or rectangular shape.

While the invention is susceptible of various modifications and alternative constructions, we have shown in the drawings and have described in detail the preferred embodiments. However, it is to be understood that we do not thereby intend to limit the invention to the specific form disclosed, but intend to cover all modifications and alternative constructions falling within the spirit and scope of the invention as expressed in the appended claims.

We claim as our invention:

1. An adjustable filling device comprising in combination a vacuum filling head to be inserted into an open container and having a passageway terminating in a mouth and connected to a supply of filling material, means for creating a suction within the container to cause the material to be drawn into the container through the mouth, and an air-tight container enclosure means adjustably interengaged with the head to change the depth of head insertion into the container and the position of said mouth with respect to the container top to control the amount of material filled into the container by the material in the container rising to the height of the mouth and blocking the passageway.

2. An adjustable filling device comprising in combination a vacuum filling head to be inserted in a container, a vacuum tight container enclosing and supporting means including a shroud adjustably interengaged with the head to vary the depth the head is inserted into the container thereby controlling the amount of powdered material filled, said shroud having a passage for evacuating the air between the shroud and container wall, and sealing means between the shroud and head preventing the filling material from escaping into the atmosphere.

3. An adjustable filling device comprising in combination a vacuum filling head having a portion to be inserted into an open container, a vacuum tight container-enclosing and supporting means including a shroud, adjustment threads between the head and shroud for turning the shroud up or down adjusting the depth of insertion of the head into the container to control the depth of fill, and a sealing means carried between the container top and head and positioned between the threads and filling chamber to isolate the filling chamber from the threads preventing filling material from contacting the threads.

4. An adjustable filling device comprising in combination a vacuum filling head to be inserted in an open ended container, a vacuum tight container-enclosing and support means including a shroud threaded to the head, connecting means to attach a vacuum source to the shroud to withdraw air therefrom, said shroud having at least two passageways spaced circumferentially equidistant from each other, the one nearest the connecting means to be connected thereto when the shroud has been rotated to adjust the depth to which the head is to be inserted into the container, and means closing the remaining passageway.

5. An adjustable filling device comprising in combination a filling head to be inserted in a container end, a container-enclosing support means including a shroud threaded to the head to turn up and down to adjust the insertion of the head into the container, means to connect the shroud to a vacuum source, a plurality of radial passageways circumferentially equidistant around the shroud, the one closest the connecting means attached thereto, the remaining passageways closed, and a gasket carried between the shroud and head and positioned between the filling chamber and threaded portion preventing filling material from contacting the threads.

6. An adjustable filling device comprising in combination a vacuum filling head having an annular threaded portion, a tubular shroud threaded thereto and enclosing the container, means to evacuate air between the shroud and container wall, a platform, resilient means for pushing the platform upwardly on the container, a gasket carried by the shroud against which the container top is pressed, said gasket isolating the filling chamber from the area between the shroud and container wall, a seal between the shroud and resilient platform, and a second gasket carried between the shroud and head and positioned between the filling chamber and threaded portion preventing the filling material from contacting the threads.

7. An adjustable filling device comprising in combination a series of vacuum filling heads, a vacuum tight container supporting means including a shroud adjustably threaded to each head to vary the head position relative to the container top, and connecting means operatively connected between each shroud to rotate shrouds in unison as one shroud is turned to adjust the series of heads uniformly and simultaneously.

8. An adjustable filling device comprising in combination a centrally located mounting member, a series of vacuum filling heads mounted in a circular pattern radially thereof, a vacuum tight container supporting means including a shroud adjustably threaded to each head to vary the head relative to the container top, a series of gear teeth circumferentially arranged around each shroud, a chain extending around the circular pattern of shrouds contacting the outwardly facing teeth of each shroud, and means to operate the chain linearly to adjust the series of shrouds uniformly and simultaneously.

9. An adjustable filling device comprising in combination a vacuum filler head for insertion into an open container, a tubular shroud interengaged therewith at one end and open at the opposing end, adjustment means between the head and shroud to vary the position of the head with respect to the container top, a seal carried by the shroud against which the container top abuts, the distance from the seal to the open end of the shroud equal to the container height, a resilient platform urging the container into abutment through the open shroud end, and a seal between the platform and shroud.

10. An adjustable filling device comprising in combination a filling head for insertion in a container top, the head having a filling mouth through which the material is filled into the container, means for creating a suction within the container to cause the material to be drawn into the container through the mouth, supporting means for the container including a shroud enclosing the container and engaging the head forming a vacuum tight joint, said shroud defining the position of the container with respect to the head and mouth, and adjustment means moving the shroud with respect to the head to adjust the insertion of the filling head into the container top to thereby control the depth of material which will pile up against the mouth to stop the flow and control the amount of material filled into the container.

11. An adjustable filling device comprising in combination a filling head for insertion in a container top, supporting means for the container including a shroud enclosing the container and slidingly engaged with the head, a seal between the head and shroud, and an adjustment shaft threaded between the head and shroud to move said head and shroud together or apart thereby adjusting the depth of insertion of the filling head in the container opening.

12. An adjustable filling device comprising in combination a series of filling heads mounted as a unit for insertion into open containers, each head having a filling mouth through which the material flows after it enters the container, means for creating a suction within the container to cause the material to be drawn into the container through the mouth, supporting means including shrouds interengaged with said heads, sealing means between each head and shroud to prevent filling material from escaping, and adjustment means between the heads and supporting means to move said heads and supporting means toward each other or apart to change the depth of insertion of the filling head and its mouth into the container to thereby change the amount which is filled into the container before the material piles up against the mouth to stop the flow.

13. An adjustable filling device comprising in combination a hollow container supporting and enclosing means, a filling head for filling powdered material concentrically inserted into the upper end of the enclosing means with a small clearance between the head and enclosing means sufficient to provide a space for the upper container walls to pass over the head and to prevent turbulent filling material from passing up over the edge of the container, a seal between said enclosing means and head to seal the shroud interior from atmosphere and positioned above said clearance space as to not interfere with the passage of the container walls over the head, and a support member for supporting the container within the shroud.

14. An adjustable filling device comprising in combination a vacuum filling head to be inserted into an open container, a shroud having the same tubular shape as the container and adjustably interengaged with the head, the space between the head and shroud sufficient only to accommodate a container top and preventing powdered filling material from passing between the head and container walls, a seal between the filling head and shroud to seal the shroud interior from atmosphere and being positioned above said space to avoid interference with the container top, and means for supporting the container within the shroud.

15. An adjustable filling device comprising in combination a vacuum filling head to be inserted into an open container, a shroud enclosing the container, adjustment means to move the shroud toward or away from the head, an elevator movable toward and away from the shroud to insert and remove a container from the shroud, and second adjustment means defining the limit of movement of the elevator toward the shroud to maintain a predetermined relationship between the elevator and shroud and container and shroud as the position of the shroud is varied by said first adjustment means.

16. An adjustable filling device comprising in combination a vacuum filling head to be inserted into an open container, a shroud enclosing the container, the upper portion surrounding the head, the space between the head and shroud being large enough to admit only the container top, adjustment means to move the shroud toward or away from the head, an elevator movable toward and away from the shroud to insert and remove a container from the shroud, and second adjustment means defining the limit of movement toward the shroud to control the depth to which the container is inserted into the shroud as the position of the shroud is varied by said first adjustment means.

17. An adjustable filling device comprising in combination a filling head for inserting into the mouth of a container to be filled and containing a material opening and an air passageway for applying a suction to the container, a downwardly extending flange extending around the head and carrying female threads, a container positioning member carrying mating male threads and adjustably screwed into said flange to adjust the position of a container relative to the head, said member having a shoulder against which the container abuts, the shoulder located within and substantially opposite the threaded portion so that the container top is located opposite the threads in filling position, and means holding the container against said shoulder.

18. An adjustable filling device comprising in combination a filling head for inserting into a container and having a material opening and an air passageway for applying a suction to the container, said filling head having a smooth outer wall of uniform vertical dimensions having substantially the same shape as the container, an adjustable container positioning member having a shoulder against which the container is held in filling position, means for adjusting the position of the head with respect to the positioning member, a resilient gasket positioned on said shoulder and bearing against the outer wall of the head, said gasket preventing air and filling material from passing over the container edge and also past the head, and means holding the container top against said gasket and shoulder during filling and squeezing the resilient gasket inwardly against said smooth outer wall to obtain a tight seal.

References Cited in the file of this patent

UNITED STATES PATENTS

| Number | Name | Date |
|---|---|---|
| 779,537 | Dundley | Jan. 10, 1905 |
| 1,643,990 | Malmquist | Oct. 4, 1927 |
| 1,779,879 | Hauger et al. | Oct. 28, 1930 |
| 1,893,716 | Ronzone | Jan. 10, 1933 |
| 2,170,469 | Carter | Aug. 22, 1939 |
| 2,428,598 | Weaver | Oct. 7, 1947 |
| 2,509,756 | Berthelsen | May 30, 1950 |
| 2,513,143 | Carter | June 27, 1950 |